(12) United States Patent
Chen

(10) Patent No.: US 10,018,841 B1
(45) Date of Patent: Jul. 10, 2018

(54) MULTI-DISPLAY HEAD-UP DISPLAY DEVICE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 12 days.

(21) Appl. No.: 15/400,972

(22) Filed: Jan. 7, 2017

(51) Int. Cl.
*G02B 27/14* (2006.01)
*G09G 5/00* (2006.01)
*G02B 27/01* (2006.01)
*B60K 35/00* (2006.01)

(52) U.S. Cl.
CPC .......... *G02B 27/0101* (2013.01); *B60K 35/00* (2013.01); *B60K 2350/1072* (2013.01); *B60K 2350/2052* (2013.01); *B60K 2350/2065* (2013.01); *B60K 2350/40* (2013.01); *G02B 2027/013* (2013.01); *G02B 2027/0141* (2013.01)

(58) Field of Classification Search
CPC .... G02B 2027/0112; G02B 2027/0145; G02B 2027/0154; G02B 2027/0161; G02B 2027/0163; G02B 2027/0185; G02B 2027/0196; G02B 27/01; G02B 27/0101; G02B 27/0149; G02B 2027/014
USPC .......................... 359/630, 631, 633; 345/7, 9
See application file for complete search history.

(56) References Cited

U.S. PATENT DOCUMENTS

2016/0109714 A1\* 4/2016 Chen .................. G02B 27/0179
353/13

\* cited by examiner

*Primary Examiner* — William Choi
(74) *Attorney, Agent, or Firm* — Guice Patents PLLC

(57) ABSTRACT

The present invention relates to a multi-display head-up display device, which includes a main body, a first optical path module and a second optical path module, wherein the first optical path module is provided to project images on a closer position in front of drivers' eyes, the second optical path module is provided to receive external image light source for obtaining a longer optical path and projecting image to a far distance, to reduce visual vertigo and obtain the best visual effects for drivers, to thereby improve driving safety.

10 Claims, 4 Drawing Sheets

MULTI-DISPLAY HEAD-UP DISPLAY DEVICE

BACKGROUND OF THE INVENTION a) Field of the Invention

The present invention relates to a multi-display head-up display device and, more particularly, to a head-up display device for drivers to reduce visual vertigo, a first optical path module is provided to project images on a closer position in front of drivers' eyes, and a second optical path module is provided to receive external image light source for obtaining a longer optical path and projecting image to a far distance, to reduce visual vertigo and obtain the best visual effects for drivers, to thereby improve driving safety.

b) Description of Prior Art

Nowadays, head-up display technology used in vehicles is not as complicated as the head-up displays used in airplanes; it is an optical system, and it is generally consisted of two main devices, a projector and a combiner, the projector is consisted of a signal light source, a projection mirror and other optical elements, the signal light source of the projector is consisted of a LCD monitor or a CRT cathode ray tube, light is emitted from the signal light source, and then projected to the combiner on a glass (or a special transparent screen) by the projector, and the combiner is provided to show texts or images.

As shown in FIG. 1, it is a schematic diagram of a head-up display of the cited reference U.S. Pat. No. 7,936,518, the head-up display includes an infrared emission unit 5A, which is provided to emit an infrared ray to a user DA; a mirror element 3A, which is provided to emit a visible light LA reflected from a display 2A towards a concave mirror 4A, and emit the infrared ray reflected from the user DA and the concave mirror 4A; multiple imaging units 6A, 7A faced the concave mirror 4A are provided to sense infrared ray, each image is from different direction; and an image processing unit 8A, the concave mirror 4A is provided to project the visible light LA to a windshield WA, and reflect a virtual image VA to eyes of the user DA.

Based on the concave mirror principle that the virtual image distance is the object optical path length multiply by magnification of the concave mirror, the virtual image distance could be large if: (1) the magnification of the concave mirror may be increased, however, an ideal lens could not be produced due to process of concave mirrors that the virtual images received by two eyes could not be exactly the same, thus the imaging error is larger if the magnification is greater, the imaging error received by two eyes may cause viewers feel dizzy, the magnification would usually be controlled within seven times for comfort of viewing; (2) the object optical path length may be enlarged, however, a head-up display is usually set inside the dashboard in front of the driver, the space is limited, a reflector is additionally set between the optical machine and the concave mirror to let optical path be reflected back and forth for enlarging the object optical path length, but the virtual image distance of a common head-up display could only achieve 2.5 meter from driving eyes due to length restrictions.

Vehicle navigation is mainly provided to guide drivers to switch to a correct lane or to warn for keeping distance to front vehicles. However, head-up displays often draw drivers' attention away from road for navigation, so it is obviously not a good operation mode. If the guidance signs could be pasted on the images of roads or warning front vehicles, drivers may not divert their attention, so it is the ideal way of giving information for drivers, and the key to the problem is how to enlarge the display distance of head-up displays to directly paste signals on roads or warning front vehicles, it is an important subject to be solved.

In order to solve the aforementioned technical bottlenecks, the industry has proposed various solutions, related technologies may be referred to cited references TW 1443377, TW 1506299, TW 201624101, CN 201610134321, TW 201410829066, CN201510649759, CN201520418145, TW 1446001.

The above cited references have already disclosed related head-up display technology, but there are some drawbacks commonly existed in use:

1. Refer to the above cited references, single projection device is provided to project vertical split screen in some of them, but the drawback is that the projected standard distance image is too short, drivers may easily experience visual dizziness when watching it and then driving safety may be affected.

2. Although a standard distance image and a longer distance image could be projected by using two or more projection devices or more split screen in some of the cited references, multiple projection devices are mostly set on the same location, and the provided images are mostly horizontal split screens in the same horizontal plane without vertical split screens, thus it is not easily to precisely paste navigation Guidance signs on the roads or warning front vehicle, so that navigation guidance effect may be greatly reduced.

SUMMARY OF THE INVENTION

In view of the above drawbacks of conventional head-up display devices, the inventor finally completed the multi-display head-up display device of the present invention after numerous improvements, namely, the object of the present invention is to provide a head-up display device for drivers to reduce visual vertigo, a first optical path module is provided to project images on a closer position in front of drivers' eyes, and a second optical path module is provided to receive external image light source for obtaining a longer optical path and projecting image to a far distance, to reduce visual vertigo and obtain the best visual effects for drivers, to thereby improve driving safety.

To achieve the object, the multi-display head-up display device of the present invention, including:

a main body, a containing space and an opening are set inside;

a first optical path module, which is set in the containing space, the first optical path module includes a first optical machine and a first concave mirror, the first concave mirror is provided to reflect and enlarge image of the first optical machine and project upwards on a windshield through the opening;

a second optical path module, which is set in the containing space, the second optical path module includes a second concave mirror, the second concave mirror is provided to reflect and enlarge an external image light source and project upwards on a windshield through the opening;

by the above structure, the first optical path module is provided to project images on a closer position in front of drivers' eyes, the second optical module is provided to receive an external image light source, the feature is: a length of an optical path of the external image light source is depended on the distance between the second concave mirror and the external image light source without being limited by a size of the main body, the longer optical path could be obtained and images could be projected to a far distance.

The first optical path module further includes a first reflector, the first reflector is set in the containing space to reflect images projected by the first optical machine.

The first optical path module further includes a first rotary shaft, the first concave mirror is fixed to the first rotary shaft, the position of images projected on the windshield is provided to be adjusted by rotating the first rotary shaft.

The second optical path module further includes a second rotary shaft, the second concave mirror is fixed to the second rotary shaft, the position of images projected on the windshield is provided to be adjusted by rotating the second rotary shaft.

The second optical path module further includes a second optical machine, and the second optical machine is an external image light source.

The second optical machine further includes a second reflector, the second reflector is set in front of the second optical machine to reflect images projected by the second optical machine.

The second optical machine is set on a border between a roof of a vehicle and the windshield.

The second optical machine is set on a roof of a vehicle

The multi-display head-up display device of the present invention further includes a reflection film, the reflection film is set on the windshield.

The main body is set on a vehicle dashboard.

In the multi-display head-up display device of the present invention, a first optical path formed by the first optical path module 2 is mainly provided to project images on a closer position in front of drivers' eyes to form a first virtual image; the second optical module is provided to receive an external image light source to form a second optical path, so that a longer optical path could be obtained and images could be projected to a far distance without being limited by a size of the main body.

The first virtual image and the second virtual image are respectively provided to display different information, the first virtual image is provided to display necessary text, images for a long time, the second virtual image is provided to briefly (flashing) display turning or danger warning signs on real images with a horizontal display angle. Since imaging of the second virtual image would be displayed in flashing mode, the imaging time could be reduced, to thereby reduce visual vertigo for drivers and obtain the best visual environment, to thereby improve driving safety.

DETAILED DESCRIPTION OF THE INVENTION

Figure 1:
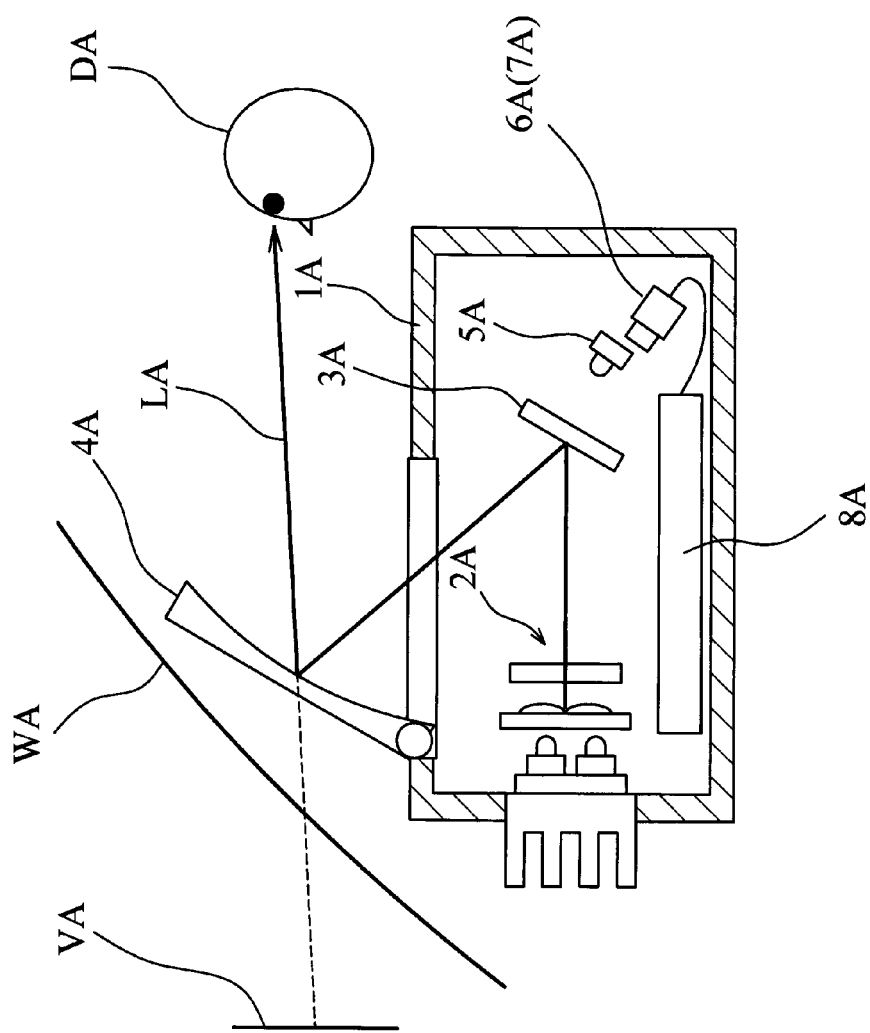
FIG. 1 is a schematic diagram of a conventional head-up display device.
Figure 2:
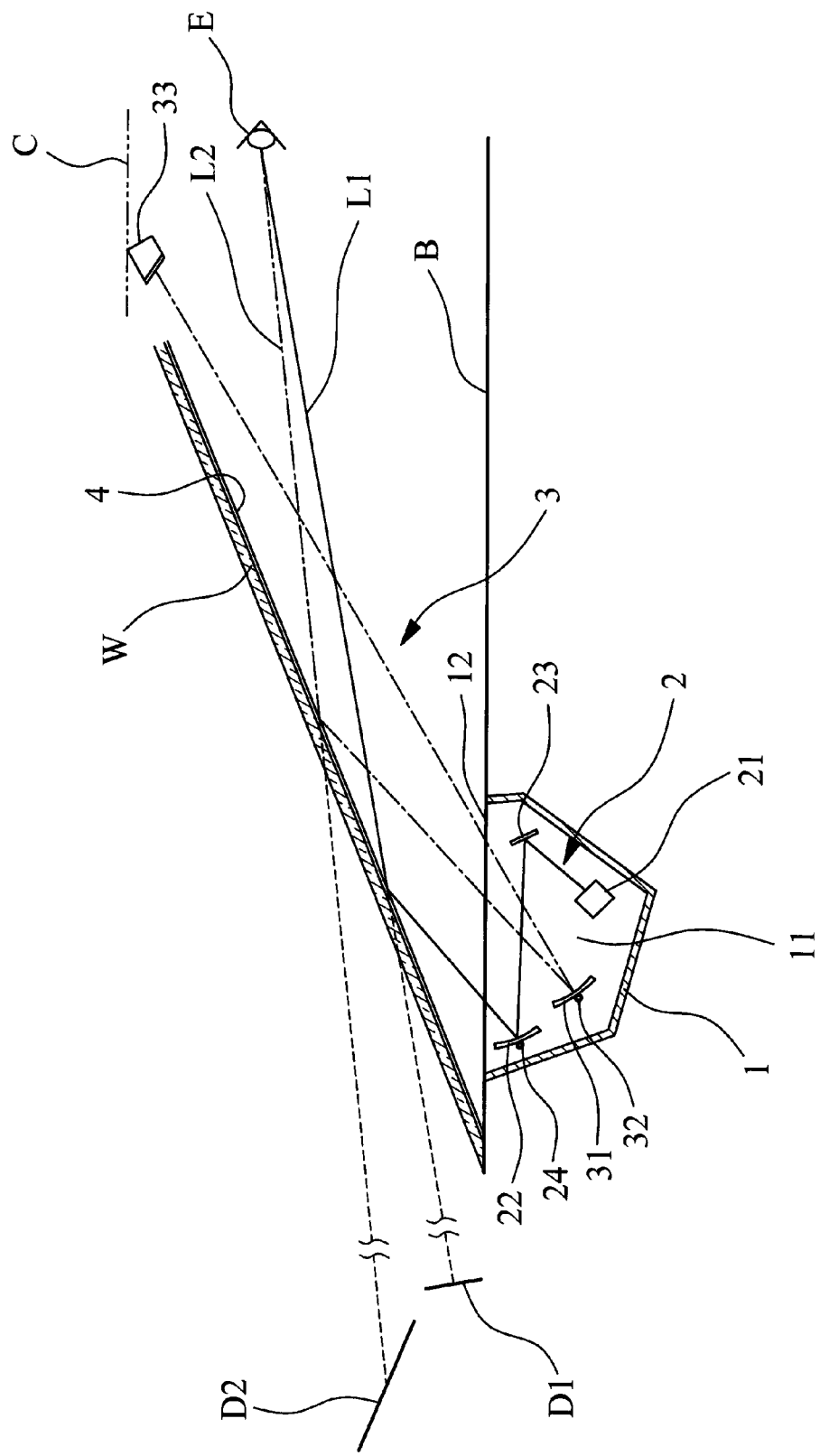
FIG. 2 is a schematic diagram of the first embodiment of the present invention.

Please refer to FIG. 2, which shows the first embodiment of the multi-display head-up display device of the present invention, including:

a main body 1, a containing space 11 and an opening 12 are set inside;

a first optical path module 2, which is set in the containing space 11, the first optical path module 2 includes a first optical machine 21 and a first concave mirror 22, the first optical machine 21 is provided to project images as a first optical path L1, the first concave mirror 22 is provided to reflect the first optical path L1 and enlarge image of the first optical machine 21, the first optical path L1 is projected upwards on a windshield W through the opening 12;

a second optical path module 3, which is set in the containing space 11, the second optical path module 3 includes a second concave mirror 31, the second concave mirror 31 is provided to reflect and enlarge a second optical path L2 from an external image light source, the second optical path is projected upwards on the windshield W through the opening 12;

by the above composition, principle of virtual imaging is imaging by using a concave mirror, the imaging formula of a concave mirror is: $1/p+1/q=1/f$, wherein f: focal distance, q: object distance, p: image distance, by using a general magnification, virtual images could be enlarged and virtual image distance could also be farther at the same ratio; by the principle, the first concave mirror 22 is used to enlarge images, the image distance could be enlarged N times from the first optical machine 21 to the first concave mirror 22 on the first optical path L1 with an appropriate magnification N and the image size would also be enlarged N times; since an excessive magnification may cause visual vertigo, the magnification is usually set as less than sever times, five times is most appropriate; the image distance is only about 2.2 meters, the first optical path module 2 is provided to project images on a closer position in front of drivers' eyes E to form a first virtual image D1; the second optical path module 3 is provided to receive an external image light source to form a second optical path, the optical path length of the external image light source depends on the distance between the second concave mirror 31 and the external image light source, so it is not limited by the size of the main body 1, thus a longer optical path could be obtained, the second concave mirror 31 with greater magnification (12~15 times) is used together, so the required distance (more than seven meters) may be achieved, the imaging time could be reduced by setting the imaging in flashing mode, to reduce visual vertigo for drivers, and the feature is that images may be projected to a far distance as a second virtual image D2.

Since the first virtual image D1 and the second virtual image D2 are respectively displayed different information, the first virtual image D1 is provided to display necessary text, images for a long time, and the second virtual image D2 is provided to briefly (flashing) display turning or danger warning signs on real images with a horizontal display angle. Since imaging of the second virtual image D2 would be displayed in flashing mode, the imaging time could be reduced, to thereby reduce visual vertigo for drivers.

The first optical path module 2 further includes a first reflector 23, the first reflector 23 is set in the containing space 11, to thereby extend the distance of the first optical path L1 and reflect images projected by the first optical machine 21.

The first optical path module 2 further includes a first rotary shaft 24, the first concave mirror 22 is fixed to the first rotary shaft 24, the position of images projected on the windshield W is provided to be adjusted by rotating the first rotary shaft 24.

The second optical path module 3 further includes a second rotary shaft 32, the second concave mirror 31 is fixed to the second rotary shaft 32, the position of images projected on the windshield W is provided to be adjusted by rotating the second rotary shaft 32.

The second optical path module 3 further includes a second optical machine 33, the second optical machine 33 is set on a border between a roof C of a vehicle and the windshield W, the second optical machine 33 is an external image light source.

Figure 3:
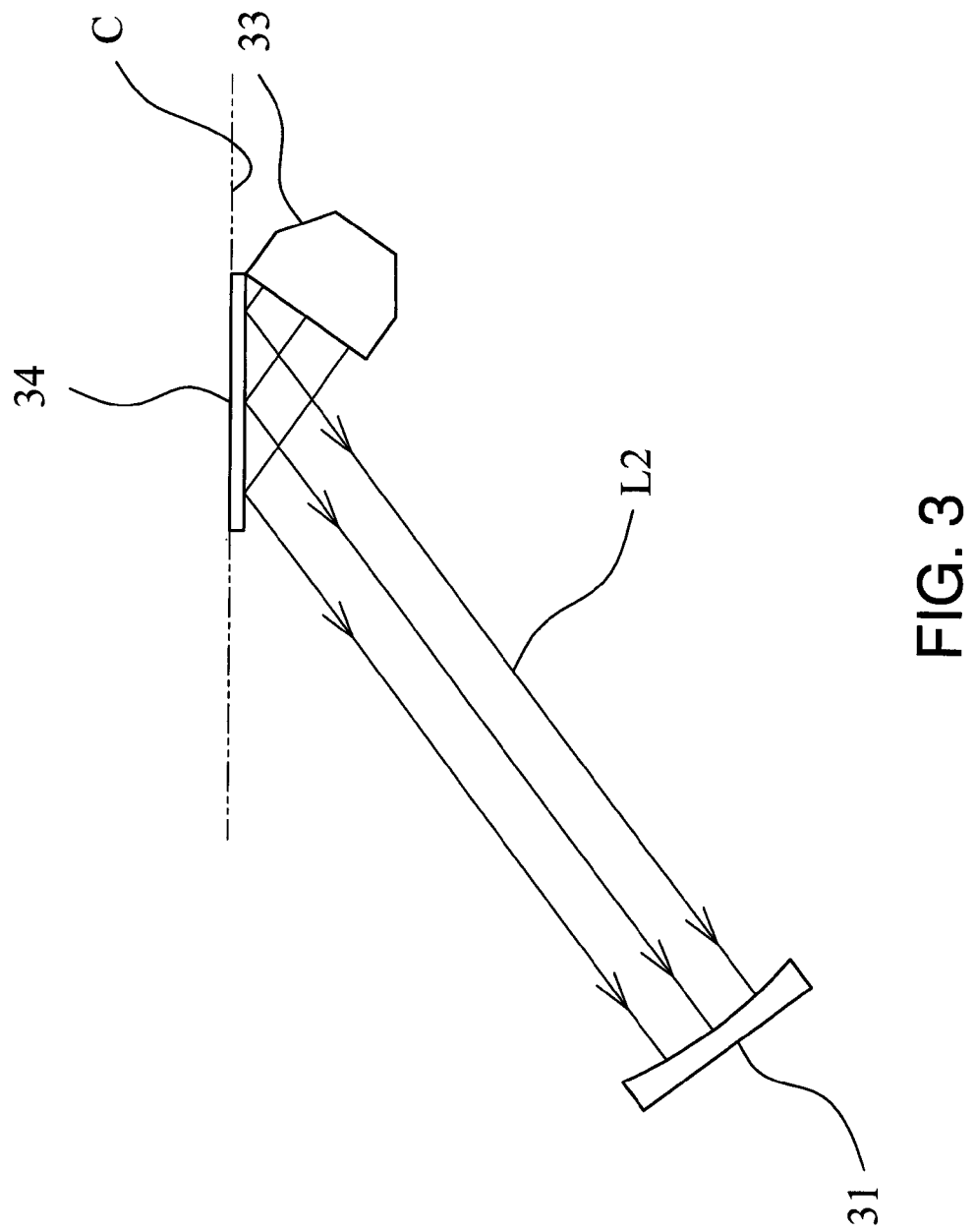
FIG. 3 is a schematic diagram of the second embodiment of the present invention.

As shown in FIG. 3, which is the second embodiment of the multi-display head-up display device of the present invention, wherein the second optical machine 33 is set on a roof C of a vehicle, the second optical machine 33 further includes a second reflector 34, the second reflector 34 is set in front of the second optical machine 33 to reflect images projected by the second optical machine 33, so as to reduce the installed height of the second optical machine 33, so that the second optical machine 33 could be set close to a roof C of the vehicle.

Figure 4:
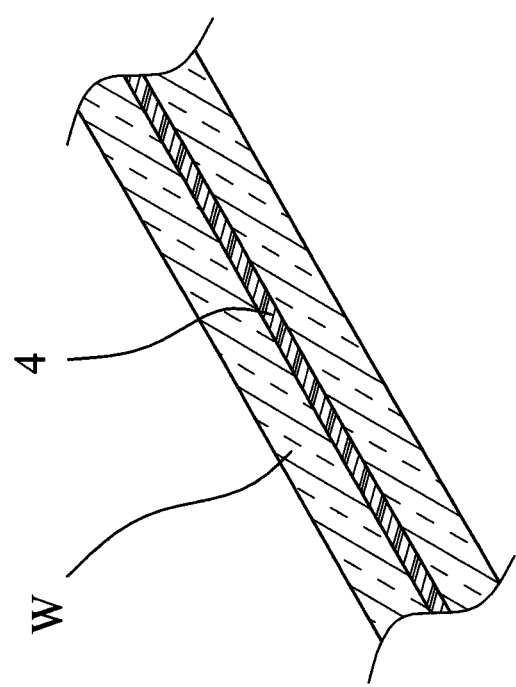
FIG. 4 is a schematic diagram of another embodiment of the windshield setting the reflection film according to the present invention.

The multi-display head-up display device 1 of the present invention further includes a reflection film 4 (as shown in FIG. 2), the reflection film 4 is set on the windshield W, the reflection film 4 could be set on an inner side of the windshield W (as shown in FIG. 2) or in the windshield W (as shown in FIG. 4), so that reflectivity of the first virtual image D1 and the second virtual image D2 could be improved.

The main body 1 is set on a vehicle dashboard B, the main body 1 could be installed on the vehicle dashboard B (not shown in figure) or embedded into the vehicle dashboard B.

The function of the first optical path module 2 of the present invention, which is equal to the function of a conventional head-up display, is provided to project images on a closer position in front of drivers' eyes, the second optical path module 3 is provided to receive an external image light source, the feature of the present invention is that the length of its optical path is depended on the distance between the second concave mirror 31 and the external image light source without being limited by the size of the main body 1, so that a longer optical path could be obtained and images could be projected to a far distance.

What is claimed is:

1. A multi-display head-up display, including:
   a main body, a containing space and an opening are set inside;
   a first optical path module, which is set in the containing space, the first optical path module includes a first optical machine and a first concave mirror, the first concave mirror is provided to reflect and enlarge image of the first optical machine and project upwards on a windshield through the opening;
   a second optical path module, which is set in the containing space, the second optical path module includes a second concave mirror, the second concave mirror is provided to reflect and enlarge an external image light source and project upwards on a windshield through the opening;
   by the above structure, the first optical path module is provided to project images on a closer position in front of drivers' eyes, the second optical module is provided to receive an external image light source, wherein a length of an optical path of the external image light source is dependent on the distance between the second concave mirror and the external image light source without being limited by a size of the main body, whereby a longer optical path could be obtained and images could be projected to a farther position.

2. The multi-display head-up display device as claimed in claim 1, wherein the first optical path module further includes a first reflector, the first reflector is set in the containing space, to reflect images projected by the first optical machine.

3. The multi-display head-up display device as claimed in claim 1, wherein the first optical path module further includes a first rotary shaft, the first concave mirror is fixed to the first rotary shaft, the position of images projected on the windshield is provided to be adjusted by rotating the first rotary shaft.

4. The multi-display head-up display device as claimed in claim 1, wherein the second optical path module further includes a second rotary shaft, the second concave mirror is fixed to the second rotary shaft, the position of images projected on the windshield is provided to be adjusted by rotating the second rotary shaft.

5. The multi-display head-up display device as claimed in claim 1, wherein the second optical path module further includes a second optical machine, the second optical machine is an external image light source.

6. The multi-display head-up display device as claimed in claim 1, wherein the second optical path module further includes a second optical machine, the second optical machine includes a second reflector, the second reflector is set in front of the second optical machine to reflect images projected by the second optical machine.

7. The multi-display head-up display device as claimed in claim 1, wherein the second optical path module further includes a second optical machine, the second optical machine is set on a border between a roof of a vehicle and the windshield.

8. The multi-display head-up display device as claimed in claim 1, wherein the second optical path module further includes a second optical machine, the second optical machine is set on a roof of a vehicle.

9. The multi-display head-up display device as claimed in claim 1, further includes a reflection film, the reflection film is set on the windshield.

10. The multi-display head-up display device as claimed in claim 1, wherein the main body is set on a vehicle dashboard.

* * * * *